United States Patent

[11] 3,576,241

| [72] | Inventors | Jean Maurice;<br>Jean Piret, Billancourt, France |
|---|---|---|
| [21] | Appl. No. | 786,653 |
| [22] | Filed | Dec. 24, 1968 |
| [45] | Patented | Apr. 27, 1971 |
| [73] | Assignees | Regie Nationale Des Usines Renault<br>Billancourt, France;<br>Automobiles Peugeot<br>Paris, France |
| [32] | Priority | Jan. 5, 1968 |
| [33] | | France |
| [31] | | 135,057 |

[54] HYDRAULIC CONTROL DEVICES OF TRANSMISSION MECHANISMS
8 Claims, 3 Drawing Figs.

[52] U.S. Cl. .................................................. 192/85,
91/31, 192/106
[51] Int. Cl. .................................................. F16d 43/00
[50] Field of Search .......................................... 192/85
(A2), 106 (F), 113; 91/31

[56] References Cited
UNITED STATES PATENTS

| 1,934,850 | 11/1933 | Fromaget .................. | 192/85A2 |
| 2,740,512 | 4/1956 | Fischer ..................... | 192/85A2 |
| 3,266,608 | 8/1966 | Lemieux .................... | 192/85 |

*Primary Examiner*—Everette A. Powell, Jr.
*Attorney*—Stevens, Davis, Miller & Mosher

ABSTRACT: This device comprises an annular actuator chamber disposed between the inner face of a bell-shaped member rigid with a hollow shaft and the registering face of an annular change-speed control piston slidably fitted in said bell-shaped member and urged towards the face thereof by a return spring. Said chamber communicates through a passage formed in said shaft with a duct formed through the wall of the transmission case and, through a valve, with the inner space of said transmission case. This duct is connected through a control distributor to the pressure oil lubrication system communicating directly with said passage. A shutter responsive to said piston is so arranged in said chamber that in the inoperative piston position said shutter will regulate the oil pressure to maintain a slight pressure within the actuator in order to reduce its response time.

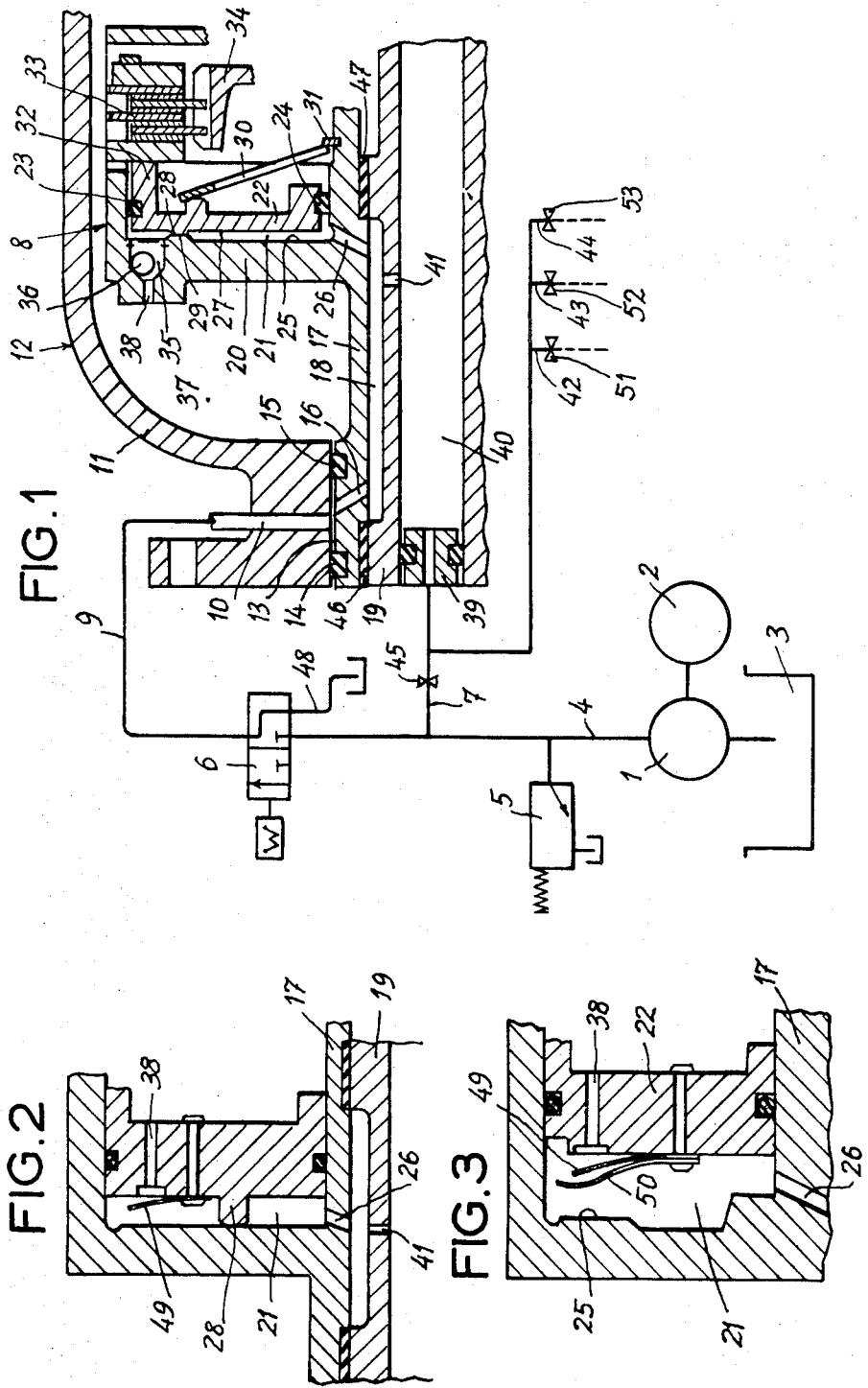

HYDRAULIC CONTROL DEVICES OF TRANSMISSION MECHANISMS

The present invention relates to hydraulic devices for controlling change-speed transmission mechanisms.

As a rule, automatic control systems of planetary-type change-speed transmissions comprise annular actuators disposed concentrically to the transmission shaft and adapted to operate brakes or clutch means for locking certain elements of the planetary gear sets.

These hydraulic actuators are generally of the very short stroke and large diameter type, and since they are driven at relatively high speed about the transmission shaft they are frequently exposed to defective working due to the emulsification of the lubricating oil or to incomplete filling.

In conventional hydraulic actuators comprising a return pipeline leading back to the reservoir under the control of a suitable valve, the capacity formed between the annular cylinder and its piston, and the capacity consisting of the duct means provided between the cylinder and the fluid distributor are substantially empty in the backward piston position, due to the centrifugal action exerted on the oil which tends to escape through the drain valve.

The response time when the oil pressure is restored is then equal to the piston stroke time plus the time period necessary for filling the above-defined capacities.

On the other hand, during the actuator rotation and when the piston is in its inoperative or backward position the oil is splashed or projected as a consequence of a pumping effect. Both oil projection and pumping effect are detrimental to the oil stability and to the maintaining of this oil at a reasonably low temperature.

The present invention has for its object, in a hydraulic control device for change-speed mechanism, of the type broadly set forth hereinabove, the provision of means whereby the response time of the hydraulic actuator is reduced by closing the valve inlet at the end of the piston stroke.

Moreover, the closing of the inlet side of the valve eliminates the detrimental oil projections and the pumping effect, thus improving the oil stability and the oil temperature conditions. To avoid possible leakages in the valve closing system there is provided according to this invention a low-output fluid supply derived from the main circuit and branched, for example, off the lubricating circuit.

The hydraulic control device according to this invention is applicable, in general, to an automotive change-speed transmission comprising a transmission shaft revolving in a concentric hollow shaft extending through the wall of the transmission case and carrying a bell-shaped member constituting an annular actuator chamber or cylinder bounded in the axial direction by the inner surface of said bell-shaped member and the registering face of an annular change-speed control piston slidably fitted in said bell-shaped member and urged towards the inner surface thereof by a return spring. Said chamber communicates through the medium of a rotary seal and a passage formed in said hollow shaft with a hydraulic fluid supply duct formed through said wall and, by means of a valve, with the inner space of said case. Said supply duct is connected through a control distributor to a pressure oil lubrication circuit communicating directly with said passage by means of an axial duct formed in the transmission shaft and also of a substantially lateral passage drilled through said shaft. This invention is characterized in that a piston-controlled shutter is so arranged in said chamber that in the inoperative position of the piston this device prevents the escape of oil through the valve.

The distributor may be so designed as to connect the supply duct, in a first one of two positions, to the lubrication oil circuit and, in the second position, to a reservoir or sump from which the pump draws the oil and forces same into the lubrication oil circuit.

The scavenging duct of the pump is advantageously provided with a pressure regulator.

The lubrication oil circuit may be connected via a branch line to the duct connecting the pump to the distributor, and in this case a throttling device is inserted in the circuit upstream of the axial passage of the transmission shaft.

The shutter may be constructed in various manners.

According to a typical form of embodiment, it consists of a circular coaxial rib formed on at least one of said faces upstream of the valve. This valve is a stop valve of which the valve member proper consists either of a ball urged by the centrifugal force to an open position when the distributor is in its second position, or a diaphragm, disc or elastic blade normally spaced from the valve seat in its inoperative position. Therefore, in the inoperative piston position the rib prevents the oil from flowing in said chamber towards the valve and the latter remains open as long as the distributor cuts off the passage leading to the supply duct.

According to another form of embodiment of the shutter the latter comprises a port associated with a seat formed in one of said registering faces and a disc or blade so disposed that it is caused to engage and close said port by the piston in the end position thereof.

In addition to the advantageous features already set forth hereinabove the device of this invention, in case of accidental overload in the lubrication system, affords a slight movement of the piston for automatically limiting the inner pressures of the hydraulic actuator at values lower than those necessary for controlling this actuator.

In this case, the control device according to this invention is advantageous in that it prevents the undesired piston movement by converting the increment in disturbing pressure into a loss of load resulting from the throttling action produced by said circular rib upstream of the discharge valve.

Another advantageous feature characterizing this arrangement is that the aforesaid rib also acts as a limit stop to the piston in its inoperative position and permits forming in this position a residual capacity constantly filled with oil, so that the piston can move readily when the pressure is restored, the filling time being suppressed and the oil pressure being exerted immediately against the entire piston area.

It is clear that the throttling effect can also be obtained by providing two ribs or beads registering with each other and formed the one on the inner surface of said bell-shaped member and the other on the inner surface of said piston.

The invention will now be described with reference to the accompanying drawing illustrating diagrammatically by way of example different forms of embodiment of the device.

In the drawing:

FIG. 1 is a diagrammatic radial section of a device constructed according to this invention, and FIGS. 2 and 3 are similar views showing constructional details of two different forms of embodiment of the flap valve.

As illustrated in FIG. 1, a pump 1 driven from a motor 2 draws oil from a reservoir or sump 3 and forces same through a delivery or scavenging line 4 provided with a pressure regulating device 5 into a two-position distributor 6 and a lubrication duct 7.

The distributor 6 communicates with the rotary annular actuator 8 via a supply line 9, a duct 10 formed through the wall of the case 11 of the change-speed transmission 12, a rotary seal 13 comprising two packing rings 14 and 15, a passage 16 formed in the hollow shaft 17 of the transmission mechanism and an annular recess 18 formed in the transmission shaft 19 revolving concentrically in said hollow shaft 17.

The cylinder of actuator 8 consists of a bell-shaped member 20 solid with the hollow shaft 17 and revolving in relation to the transmission case 11. Thus, the shaft 19, coupled to, or in driving engagement with, any suitable member of the transmission mechanism, revolves in the bore of said bell-shaped member.

In the bell-shaped member 20, the annular chamber 21 of the actuator encloses the sliding annular piston 22 provided with packings 23 and 24. The chamber 21 bounded on one side by the inner face 25 of the bottom of said bell-shaped member 20 communicates through a passage 26 formed in the wall of hollow shaft 17 with the annular cavity 18 formed between said hollow shaft 17 and the transmission shaft 19.

The front or operative face 27 of piston 22 comprises an integral circular bead or rib 28 coacting with a registering bead or rib 29 formed on the inner face 25 of chamber 21.

An annular return spring 30 surrounding the hollow shaft 17 reacts against a circlip 31 fitted in an annular groove of this hollow shaft and urges the piston 22 to its inoperative position, i.e. towards the registering face 25.

When the oil flowing into the chamber 21 drives the piston 22 the latter exerts with its axial peripheral skirt 32 a pressure against the set of annular discs 33 which, by drivingly coupling the bell-shaped member 20 to a fixed or rotary member 34 of the transmission mechanism, causes a gear change to take place.

The portion of chamber 21 which lies externally of the pair of registering beads or ribs 28, 29 communicates with a valve chamber 35 formed in the wall of the bell-shaped member 20 and containing a ball valve 36. This valve chamber 35 communicates with the inner space 37 of the transmission case 11 via an axial passage 38 constituting the valve seat. Whether in its inoperative or open position, or urged by the centrifugal force, the ball valve 36 remains unseated. This ball valve 36 is moved to its seated position only when the oil flow exceeds a predetermined limit. It is clear that the inner space of the transmission case 11 is connected by a return pipeline (not shown) to the reservoir or sump 3.

The lubrication pipeline 7 is connected, inter alia, via a rotary seal 39, to an axial passage 40 formed in the transmission shaft 19 and adapted to lubricate various component elements of the transmission (not shown). A substantially radial passage 41 of reduced cross-sectional area connects the axial passage 40 to the annular recess 18. Other lubrication passages and ducts 42 to 44 may be connected to said pipeline 7. A throttling device 45 is provided for limiting the oil output in the lubrication circuits in which the pressure is maintained by throttling means 51, 52 and 53.

With this arrangement it is possible to properly lubricate two bearings 46 and 47 whereby the transmission shaft 19 is rotatably mounted in the hollow shaft 17, these bearings being disposed on either side of the annular recess 18. Of course, the clearances controlling the permeability of these bearings are determined with a view to avoid any interference with the operation of the actuator 8 as a consequence of undesired appreciable leakages.

The distributor 6 may be controlled by means of any suitable manual or automatic means, whether of mechanical, electromagnetic, pneumatic or hydraulic character. The supply pipeline 9 is connected in one of its two positions to the scavenging circuit 4 of the fluid pump 1, and in the other position with the return line 48 leading to the oil sump 3.

The above-described device operates as follows:

When the distributor 6 is in the position illustrated in FIG. 1, the supply pipeline 9 communicates with the sump 3 via pipeline 48.

Under these conditions the lubrication system supplies only chamber 21 of actuator 8 via pipeline 7 and passage 40, orifice 41, recess 18 and passage 26.

The oil pressure $P_1$ then prevailing in chamber 21 is set at a value lower than the pressure value necessary for overcoming the force of spring 30. The ball valve 36 is not seated by the working pressure of the actuator and the centrifugal force moves this ball valve outwards, i.e. towards the outer periphery of recess 35.

The pressure $P_2$ in the lubrication system, which is controlled as a function of the pump pressure by the throttling device 45 and also the permeability of bearings 46 and 47, exerts in chamber 21, of which the active surface lies between the rib 28 and the piston bore, a force inferior to the return force of spring 30.

As shown in FIG. 1, the pressure $P_1$ is kept at a relatively low value by the throttling action produced between the ribs 28 and 29, the passage area therebetween depending on the pressures $P_1$ and $P_3$ and also on the force of the antagonistic spring 30, this pressure $P_3$ being that prevailing in chamber 21 but beyond ribs 28 and 29.

The dimension of the orifice 38 is sufficient to maintain the above-defined pressure $P_3$ within the low-pressure range notwithstanding an output disturbance produced by an increment in pressure $P_2$.

As a whole, the system behaves like a direct-action regulator of which the throttling member consists of ribs 28 and 29.

With this arrangement, the forces urging the piston are scarcely responsive to the variations of the pressure $P_2$ within the regulation range.

In case of pressure increment the piston 22 moves very slightly to the right and opens the passage between ribs 28 and 29, so as to reduce the value of pressure $P_1$ by an overflow action.

The fluid then flows through an orifice 38 of a size calculated to create but a moderate loss of load (below the value necessary for seating the ball valve), a piston 22 being then in a position of equilibrium.

To control the movement of piston 22 the distributor 6 is actuated to cause the delivery or scavenging line 4 to communicate with the supply line 9. The power fluid pressure is communicated via passage 16, annular recess 18, orifice 26, cylinder-forming chamber 21 and the passage left between ribs 28 and 29 to the ball valve 36.

During the transitory condition the power fluid produces an output creating, at the level of the seat of port 38, a pressure differential sufficient to cause the ball 36 to be seated and thus close the valve.

Thus, the pressure builds up in the chamber formed between the registering faces 25 and 27 of the bell-shaped member 20 and piston 22, whereby this piston 22 is moved to the right as seen in the FIG.

As the power fluid is delivered to pipeline 9, passage 16, recess 18 and annular chamber 21 already filled with oil, the response time of the hydraulic actuator is shorter than that of actuators constructed according to the known principle, notwithstanding the fact that one fraction of the power fluid flows from recess 18 to pipeline 7 through the radial passage 41, axial passage 40 and rotary seal 39.

This output loss is extremely moderate for the cross-sectional area of passage 41 is very small and the pressure differential between $P_1$ and $P_2$ remains relatively small.

The passage 41 may be very small without impairing the proper operation of the mechanism, for the lubrication is also ensured by means of the power fluid when the actuator is operated.

In coaxial-shaft mechanism it is frequently necessary to cause the oil circuit controlling an actuator to flow through an annular chamber closed at its ends by bearings of the type designed by the reference numerals 46 and 47 in FIG. 1. In this case an oil supply must be provided for lubricating these bearings during the periods of operation in which no fluid pressure is exerted in the actuator.

In this particular instance the present invention is advantageous in that it permits of maintaining a lubrication pressure by closing the oil outlet by means of the ribs 28 and 29.

It is also advantageous in that it does not entail an appreciable increase in the manufacturing cost, since the principal members (except the piston of which the cost differs but slightly from that of a conventional piston) are already assembled.

It is a further advantageous feature of this invention that it permits reducing the magnitude of the lubrication system which, as it operates continuously, increases the output necessary for supplying the complete circuit.

Under these conditions, a pump having smaller overall dimensions and a lower cost can be used while reducing the losses of energy which are likely to prove detrimental to the efficiency, and therefore the temperature of operation of the assembly.

Other arrangements may be conceived by those skilled in the art without departing from the basic principle of the invention, as shown for example in FIGS. 2 and 3 of the drawing, wherein a disc- or blade-type valve 49 carried by the piston is substituted for the ball valve 36 of bell-shaped member 20 of FIG. 1. Thus, FIG. 2 illustrates a valve controlled automatically by the oil pressure and the piston is formed likewise with a circular rib 28. In FIG. 3, the ribs 28 and 29 are dispensed with and replaced by a spring-loaded valve 50 responsive to the backward movement of piston 22. When the piston 22 completes this backward stroke it causes the spring 50 to engage the face 25 of chamber 21, thus closing the port 38 by means of its companion blade 49.

We claim:

1. A hydraulic device for controlling an automotive change-speed transmission, comprising a transmission shaft revolving in a hollow shaft extending through one wall of the transmission case and carrying a bell-shaped member forming an annular actuator chamber bounded in the axial direction by the inner face of said bell-shaped member and the inner face of an annular change-speed control piston slidably mounted in said bell-shaped member and urged towards said inner face of said bell-shaped member by a return spring, said chamber communicating through the medium of a rotary seal and a passage formed in said hollow shaft with a hydraulic fluid supply duct passing through said wall and, through a valve, with the inner space of the transmission case, said supply duct being connected through a control distributor to a pressure oil lubrication system communicating directly with said passage by means of an axial duct formed in said transmission shaft and of a substantially radial passage formed in said shaft, a piston-actuated shutter arranged in said chamber of said annular actuator upstream of said valve, whereby in the operative piston position said shutter will regulate the oil pressure in said chamber by acting somewhat like an overflow and maintain said chamber under a substantially constant pressure.

2. A hydraulic control device according to claim 1, wherein said piston-actuated shutter comprises a coaxial circular rib formed on at least one of the faces of said chamber of said annular actuator, upstream of said valve, and said valve comprising a flap valve.

3. A hydraulic control device according to claim 1, wherein said oil pressure lubrication system is connected as a branch element to a pipeline connecting a pump to said distributor, a throttling device inserted in said circuit upstream of said axial duct of said transmission shaft.

4. A hydraulic control device according to claim 1, wherein said valve comprises a diaphragm.

5. A hydraulic control device according to claim 1, wherein said shutter comprises a port associated with a valve seat formed in one of said registering faces, and a blade so arranged as to be urged by said piston against said seat at the end of the return stroke of said piston, said blade and said valve seat forming said valve.

6. A hydraulic control device according to claim 1, wherein said valve comprises a resilient blade.

7. A hydraulic control device according to claim 1, wherein said valve comprises a disc.

8. A hydraulic control device according to claim 1, wherein said valve is a ball valve.